US011997446B2

(12) United States Patent
Li

(10) Patent No.: US 11,997,446 B2
(45) Date of Patent: May 28, 2024

(54) EARPHONE, METHOD AND DEVICE FOR CONTROLLING EARPHONE, ELECTRONIC APPARATUS AND STORAGE MEDIUM

(71) Applicant: BEIJING XIAOMI MOBILE SOFTWARE CO., LTD., Beijing (CN)

(72) Inventor: Shibo Li, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 233 days.

(21) Appl. No.: 17/681,282

(22) Filed: Feb. 25, 2022

(65) Prior Publication Data

US 2023/0128283 A1 Apr. 27, 2023

(30) Foreign Application Priority Data

Oct. 26, 2021 (CN) ......................... 202111247281.7

(51) Int. Cl.
*H04R 1/10* (2006.01)

(52) U.S. Cl.
CPC ......... *H04R 1/1041* (2013.01); *H04R 1/1016* (2013.01); *H04R 1/1066* (2013.01); *H04R 1/1091* (2013.01)

(58) Field of Classification Search
CPC .. H04R 1/1041; H04R 1/1016; H04R 1/1066; H04R 1/1091
See application file for complete search history.

(56) References Cited

U.S. PATENT DOCUMENTS

2008/0279409 A1* 11/2008 Hupkes ................ H04R 1/1066 381/370
2015/0146880 A1 5/2015 Boni
2021/0084402 A1 3/2021 Terlizzi et al.
2022/0323009 A1* 10/2022 Peters, Jr ............. A61B 5/6817

OTHER PUBLICATIONS

European Patent Application No. 22159229.8, Search and Opinion dated Sep. 5, 2022, 9 pages.

* cited by examiner

*Primary Examiner* — Simon King
(74) *Attorney, Agent, or Firm* — COZEN O'CONNOR

(57) ABSTRACT

An earphone includes an earphone body, a first eartip, a sensing module and a controller. The earphone has an in-ear earphone structure when the first eartip is mounted on the earphone body. The sensing module is arranged on an inner cavity wall of the earphone body, and configured to sense an assembly state between the first eartip and the earphone body. The controller is coupled to the sensing module, and configured to obtain the assembly state output by the sensing module, identify a current earphone mode of the earphone according to the assembly state, and adjust an acoustic parameter of the earphone according to the current earphone mode.

18 Claims, 11 Drawing Sheets

EARPHONE, METHOD AND DEVICE FOR CONTROLLING EARPHONE, ELECTRONIC APPARATUS AND STORAGE MEDIUM

CROSS-REFERENCE TO RELATED APPLICATION

This application is based on and claims priority to the Chinese Patent Application No. 202111247281.7 filed on Oct. 26, 2021, the entire contents of which are incorporated herein as reference.

BACKGROUND

True wireless stereo (TWS) earphones can be divided into half-in-ear earphones and in-ear earphones according to a position that makes contact with your ear. The two types have their own advantages. The wearing experience of the half-in-ear earphone is more comfortable, while a sound quality and a noise reduction effect of the in-ear earphone are better. The two types of earphones have different audiences, so consumers usually buy both types of the earphones for use.

SUMMARY

The present disclosure relates to the field of true wireless stereo (TWS) earphones, and more particularly, to an earphone, a method and a device for controlling an earphone, an electronic apparatus and a storage medium.

According to a first aspect of embodiments of the present disclosure, the earphone is provided, and includes: an earphone body; a first eartip, the earphone having an in-ear earphone structure when the first eartip is mounted on the earphone body; a sensing module arranged on an inner cavity wall of the earphone body, and configured to sense an assembly state between the first eartip and the earphone body; and a controller coupled to the sensing module and configured to obtain the assembly state output by the sensing module, identify a current earphone mode of the earphone according to the assembly state, and adjust an acoustic parameter of the earphone according to the current earphone mode.

According to a second aspect of the embodiments of the present disclosure, a method for controlling the earphone is provided, and includes: identifying a current earphone mode of the earphone; adjusting an acoustic parameter of the earphone according to the current earphone mode.

According to a third aspect of the embodiments of the present disclosure, a device for controlling an earphone is provided, and includes: an identification unit configured to identify a current earphone mode of the earphone; and a control unit configured to adjust an acoustic parameter of the earphone according to the current earphone mode.

BRIEF DESCRIPTION OF THE DRAWINGS

The accompanying drawings herein are incorporated into the specification and form a part of the specification, showing embodiments in accordance with the present disclosure, and are used together with the specification to explain the principles of the present disclosure.

DESCRIPTION OF REFERENCE NUMERALS

Figure 1A:
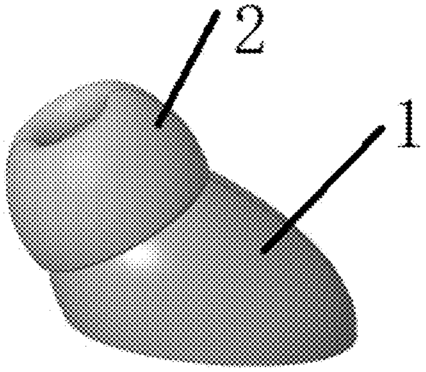
FIG. 1(*a*) to FIG. 1(*f*) are schematic diagrams of an earphone according to an embodiment of the present disclosure, in which (a) is a schematic diagram of an in-ear mode of an earphone, (b) is a schematic diagram when a first eartip is removed, (c) is a schematic diagram of a half-in-ear mode of an earphone, (d) is an exploded diagram of the earphone, (e) is a sectional diagram of the earphone, and (f) is a schematic diagram of a sound output plane of the earphone.
Figure 1B:
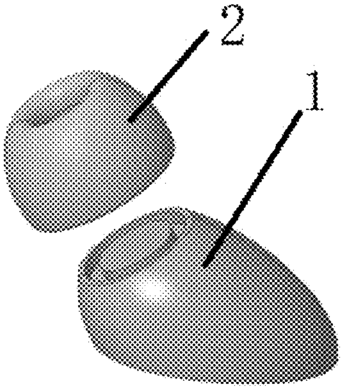
Figure 1C:
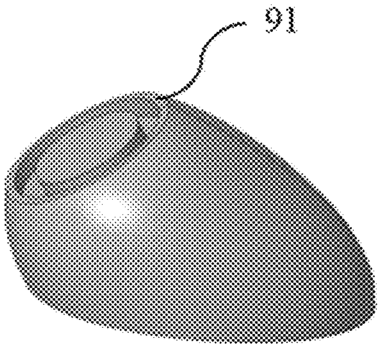
Figure 1D:
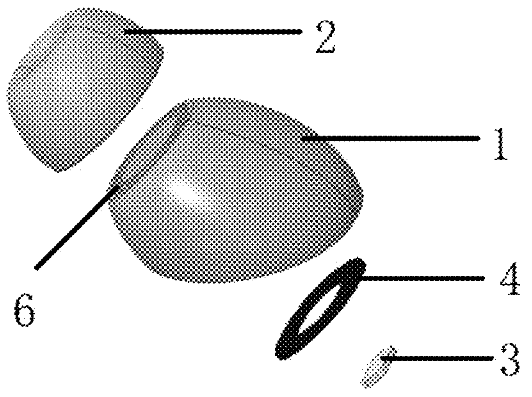
Figure 1E:
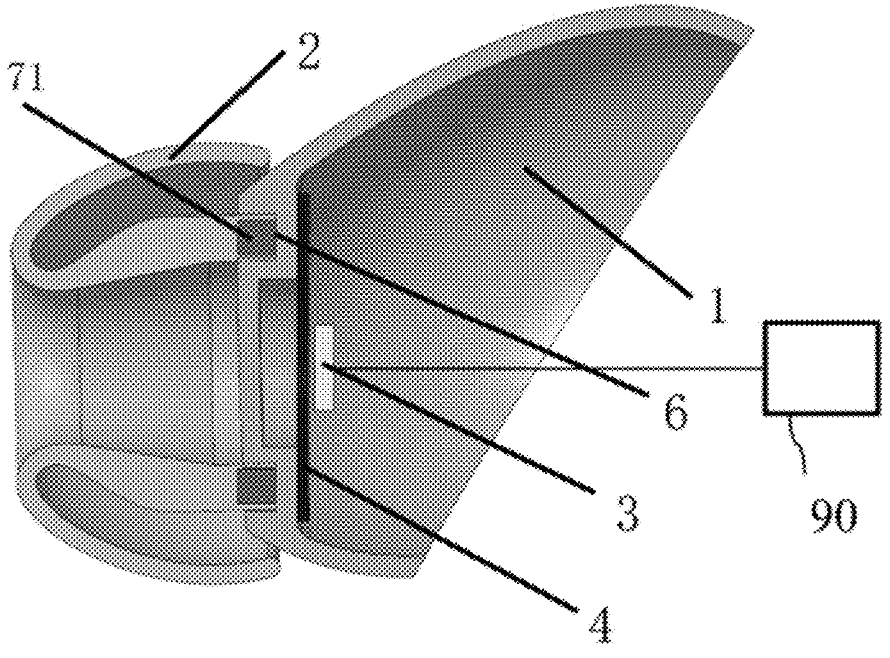
Figure 1F:
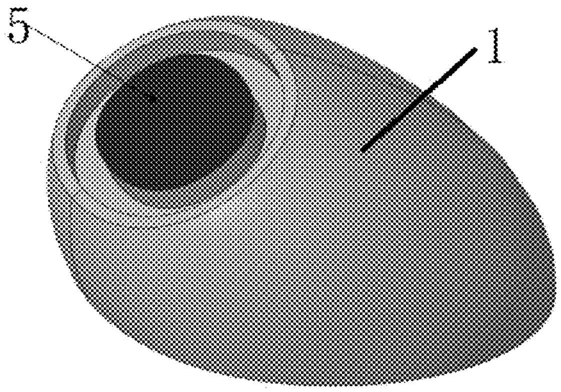

1—earphone body, 2—first eartip, 3—sensing module, 4—eartip fixing member, 5—sound output plane, 6—first annular groove, 71—magnetic member, 72—conductive element, 8—second annular groove, 9—annular protrusion, 10—second eartip, 11—detection switch, 12—first opening, 13—pressing portion, 14—second opening, 15—hard rubber bracket of ear sleeve, 16—inner end cover, 17—outer end cover, 18—positive elastic piece, 19—negative elastic piece, 20—metal member.

DETAILED DESCRIPTION

Example embodiments will be described in detail herein, and examples of the embodiments will be illustrated in the accompanying drawings. When the following description relates to the accompanying drawings, the same numbers in different accompanying drawings represent the same or similar elements unless otherwise indicated. The implementations described in the following embodiments do not represent all implementations consistent with the present disclosure. Instead, they are only examples of devices and methods consistent with some aspects of the present disclosure as detailed in the appended claims.

In the related art, the sealing of the half-in-ear earphone is poor, in order to improve an acoustic performance, generally, more acoustic holes, such as a front sound leakage hole, a rear sound leakage hole and a bass tube sound leakage hole, need to be provided for tuning. On the contrary, since the in-ear earphone has a good sealing performance and a good acoustic performance, it usually only needs to be provided with the rear sound leakage hole for tuning. Therefore, the acoustic performances of the two types of earphones are completely different, which is difficult to meet a user's needs for the in-ear mode and the half-in-ear mode.

In order to overcome the problems existing in related art, the present disclosure provides an earphone, a method and a device for controlling an earphone, an electronic apparatus and a storage medium.

It should be noted that an initial design of an earphone acoustic tuning hole is designed as a half-in-ear mode, including a plurality of acoustic holes. It is easy to realize an in-ear mode by tuning the half-in-ear mode if it is switched into the in-ear mode.

In order to solve a problem of a sound effect mismatch after switching the earphone mode for an earphone structure compatible with the in-ear mode and the half-in-ear mode, the present disclosure provides an earphone, a method and a device for controlling an earphone, an electronic apparatus and a storage medium.

In order to solve the problem of a sound effect mismatch after the earphone mode is changed, embodiments of the present disclosure provides a variety of earphones compatible with two earphone modes, and the earphone has a sensing module capable of sensing a current earphone mode of the earphone. The sound effect of the earphone is matched and adjusted according to a sensing result of the sensing module.

For a structural design of the earphone realizing two earphone modes, a variety of design schemes may be provided. One of these design schemes is that the earphone includes an earphone body and a first eartip, a front end of the earphone body is configured as a half-in-ear earphone structure, and an in-ear earphone structure is formed after the first eartip is mounted on the earphone body.

FIG. 1 is a schematic diagram of an earphone according to an embodiment of the present disclosure. Referring to FIG. 1(*a*) to FIG. 1(*f*), the earphone includes: an earphone body 1, a first eartip 2, a sensing module 3 and a controller 90. The controller 90 is coupled to the sensing module 3.

As illustrated in FIG. 1(*a*) to FIG. 1(*f*), a front end of the earphone body 1 is configured as a half-in-ear earphone structure, and the in-ear earphone structure is formed after the first eartip 2 is mounted on the earphone body 1. It is noted that, the front end of the earphone body 1 refers to a portion of the earphone configured to fit in or make contact with the ear or the ear canal.

That is, when the first eartip 2 is not mounted on the earphone body 1, the front end of the earphone body 1 can be a half-in-ear earphone structure, so that the earphone becomes a half-in-ear earphone. When the first eartip 2 is mounted on the earphone body 1, the earphone body 1 mounted with the first eartip 2 constitutes an in-ear earphone structure, so that the earphone can become an in-ear earphone. Thus, a structure scheme compatible with a half-in-ear structure and an in-ear structure can be realized depending on whether the first eartip 2 is mounted.

It can be understood that due to the different structures of the earphone, the sound effect of the earphone will be different. For example, the sound effect of the half-in-ear earphone structure is different from the sound effect of the in-ear earphone structure. In this disclosure, the structure scheme compatible with the half-in-ear structure and the in-ear structure can be realized depending on whether the first eartip 2 is mounted. Moreover, in order to switch into the corresponding sound effect when the earphone is in the half-in-ear structure or in the in-ear structure, the present disclosure can provide the sensing module in the earphone, and the sensing module identifies whether the earphone is currently in the half-in-ear mode or the in-ear mode, to switch into the corresponding sound effect based on different modes.

In an embodiment of the present disclosure, as illustrated in FIG. 1(*a*) to FIG. 1(*f*), the sensing module 3 is arranged on an inner cavity wall of the earphone body 1, and the sensing module 3 is configured to sense an assembly state between the first eartip 2 and the earphone body 1. Two assembly states can be provided: one is that the first eartip 2 is mounted on the earphone body 1, and the other is that the first eartip 2 is not mounted on the earphone body 1.

In the embodiment of the present disclosure, the controller 90 is configured to obtain the assembly state output by the sensing module 3, identify a current earphone mode of the earphone according to the assembly state, and adjust an acoustic parameter of the earphone according to the current earphone mode.

In one implementation, the controller 90 can be a core control chip in the earphone.

In the embodiment of the present disclosure, the sensing module 3 can sense that the first eartip 2 is currently mounted on the earphone body 1, so that the earphone becomes the in-ear structure. If the sensing module 3 senses that the first eartip 2 is not currently mounted on the earphone body 1, then the earphone becomes a half-in-ear structure. For example, the sensing module 3 can send the sensing result (i.e., the assembly state between the first eartip 2 and the earphone body 1) to the controller 90. The controller 90 can receive the assembly state sent by the sensing module 3. At this time, it can identify whether the earphone is currently in the in-ear mode or the half-in-ear mode according to the assembly state, and then adjust the acoustic parameter of the earphone according to the current earphone mode.

In an implementation, the acoustic parameter may include, but is not limited to, a frequency, an amplitude or a phase of various harmonic wave. For example, an acoustic curve can be formed based on the acoustic parameter such as the frequency, the amplitude or the phase of various harmonic wave, and the sound effect can be switched under different earphone modes by adjusting a value of the acoustic parameter in the acoustic curve.

For example, for the half-in-ear mode, a low frequency needs to be enhanced in principle. Therefore, when the controller 90 identifies that the earphone is currently in the half-in-ear mode, the low frequency can be enhanced by adjusting the value of the acoustic parameter in the acoustic curve, so that the earphone is currently in the sound effect corresponding to the half-in-ear mode, to meet the need of a user for the half-in-ear mode. For the in-ear mode, the low frequency needs to be reduced in principle. Therefore, when the controller 90 identifies that the earphone is currently in the in-ear mode, the low frequency can be reduced by adjusting the value of the acoustic parameter in the acoustic curve, to meet the need of the user for the in-ear mode. Therefore, it can be seen that the structural scheme compatible with the half-in-ear structure and the in-ear structure is realized for the above earphone depending on whether the first eartip 2 is mounted. For example, if the half-in-ear mode is selected, referring to FIG. 1(*c*), the earphone body 1 serves as the earphone and can be used directly; if the in-ear mode is selected, referring to FIG. 1(*a*), the first eartip 2 is mounted on the earphone body 1 for use.

The earphone according to the embodiments of the present disclosure can realize the earphone structure compatible with two earphone modes by the structural design of the first eartip and the earphone body. In addition, in the embodiment of the present disclosure, the sensing module senses the assembly state between the first eartip and the earphone body, and the controller 90 will adjust the acoustic parameter of the earphone when identifying that the earphone is currently in the in-ear mode according to the assembly state, to make the adjusted acoustic parameter meet the sound effect of the in-ear mode; the controller 90 will adjust the acoustic parameter of the earphone when identifying that the earphone is currently in the half-in-ear mode according to the assembly state, to make the adjust acoustic parameter meet the sound effect of the half-in-ear mode. Therefore, the sound effect can be automatically matched and adjusted under different modes of the earphone and the user experience is improved.

It should be noted that a sound output plane of the earphone body 1 can be parallel or not parallel to a plane where a sound output hole 91 of the earphone body 1 is located. In an optional implementation, the sound output plane 5 of the earphone body 1 can be arranged parallel to the plane where the sound output hole 91 of the earphone body 1 is located. That is to say, the sound output plane 5 of the earphone body 1 may be protruded from the plane where the sound output hole 91 of the earphone body 1 is located by a protruding distance; or the sound output plane 5 of the earphone body 1 may be coplanar with the plane where the sound output hole 91 of the earphone body 1 is located by a protruding distance; or the sound output plane 5 of the earphone body 1 may be recessed from the plane where the sound output hole 91 of the earphone body 1 is located by a recessing distance.

In order to improve the wearing comfort of the earphone, in another optional implementation, referring to FIG. 1(*f*), the sound output plane 5 of the earphone body 1 can protrude beyond the plane where the sound output hole 91 of the earphone body 1 is located, and a protruding height is less than a preset height. Therefore, through this structural design, the sound output plane of the earphone body can slightly protrude beyond the plane where the sound output hole is located, to ensure the wearing comfort of the earphone when the earphone is in the half-in-ear mode.

In order to prevent the first eartip mounted on the earphone body from falling off easily, in some embodiments of the present disclosure, referring to FIG. 1(*d*) and FIG. 1(*e*), the earphone may further include an eartip fixing member 4. The eartip fixing member 4 can be arranged on the inner cavity wall of the earphone body 1 for fixing the first eartip 2.

In the present embodiment, the eartip fixing member 4 may be made of a magnetic material or an iron material. Alternatively, the eartip fixing member 4 is provided with a magnetic material.

In the present embodiment, one or more magnetic members 71 are embedded in a mounting portion of the first eartip 2, and an area of the earphone body 1 in contact with the mounting portion of the first eartip 2 is provided with a first annular groove 6. The first annular groove 6 can be configured to positioning and initially fix the first eartip 2 when the first eartip 2 is mounted on the earphone body 1. The eartip fixing member 4 attracts the magnetic member 71 in the first eartip 2 to further fix the first eartip 2.

In some examples, the first eartip 2 can be realized by an insert injection molding process. The magnetic member 71 embedded in the first eartip 2 can be selected as an annular magnet.

In some examples, in an implementation, the eartip fixing member 4 can be an annular structure, and the material of the eartip fixing member 4 can be selected as a magnet, a soft magnetic material or an iron material, which attracts a magnet in the first eartip 2 to fix the first eartip 2.

It should be noted that the sensing module can sense the assembly state between the first eartip and the earphone body by using different principles. Due to the different principles used by the sensing module, a structure of the sensing module may be also different. For example, if the sensing module senses the assembly state between the first eartip and the earphone body by measuring a change of a magnetic field around the earphone body, the sensing module may include a Hall sensor. As another example, if the sensing module senses the assembly state between the first eartip and the earphone body by using a trigger assembly, the sensing module may include a trigger assembly. For details, a reference is made to the description of following embodiments.

As a possible implementation, referring to FIG. 1(*e*), the sensing module 3 may include the Hall sensor arranged around the eartip fixing member 4, for example, at a middle position of a side of the eartip fixing member 4 away from the first eartip 2. The Hall sensor is configured to sense the change of the magnetic field during the mounting of the first eartip 2 into the earphone body 1 and the change of the magnetic field during the removal of the first eartip 2 from the earphone body 1, to determine the assembly state between the first eartip 2 and the earphone body 1 according to the change of the magnetic field, and then send the assembly state to the controller 90. The controller 90 identifies the current earphone mode of the earphone according to the assembly state, and adjusts the acoustic parameter of the earphone according to the current earphone mode.

For example, when the Hall sensor senses the magnetic member 71, the Hall sensor determines that the first eartip 2 is mounted on the earphone body 1, and can send a first assembly state information indicating that the first eartip 2 is mounted on the earphone body 1 to the controller 90; when the Hall sensor does not sense the magnetic member 71, the Hall sensor determines that the first eartip 2 is not mounted on the earphone body 1, and can send a second assembly state information indicating that the first eartip 2 is not mounted on the earphone body 1 to the controller 90.

It can be seen that the magnetic member embedded in the first eartip has two functions in the earphone structure of the present embodiment. One function is to cooperate with the eartip fixing member to fix the first eartip; the other function is to cooperate with the Hall sensor to realize the identification of the earphone mode.

Figure 2A:
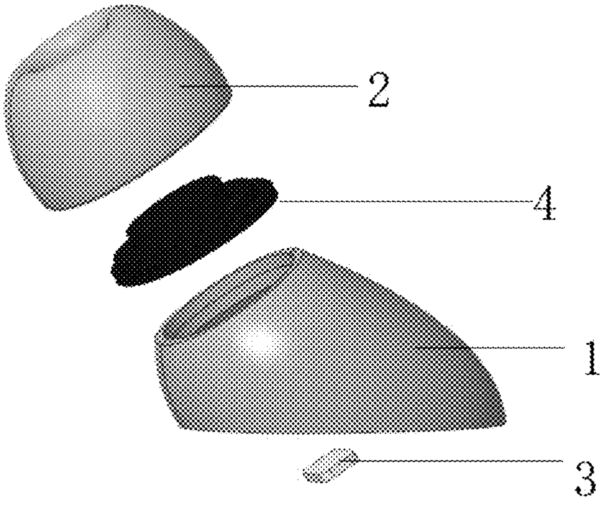
FIG. 2(*a*) to FIG. 2(*b*) are schematic diagrams of an earphone according to another embodiment of the present disclosure, in which (a) is an exploded diagram and (b) is a sectional diagram.
Figure 2B:
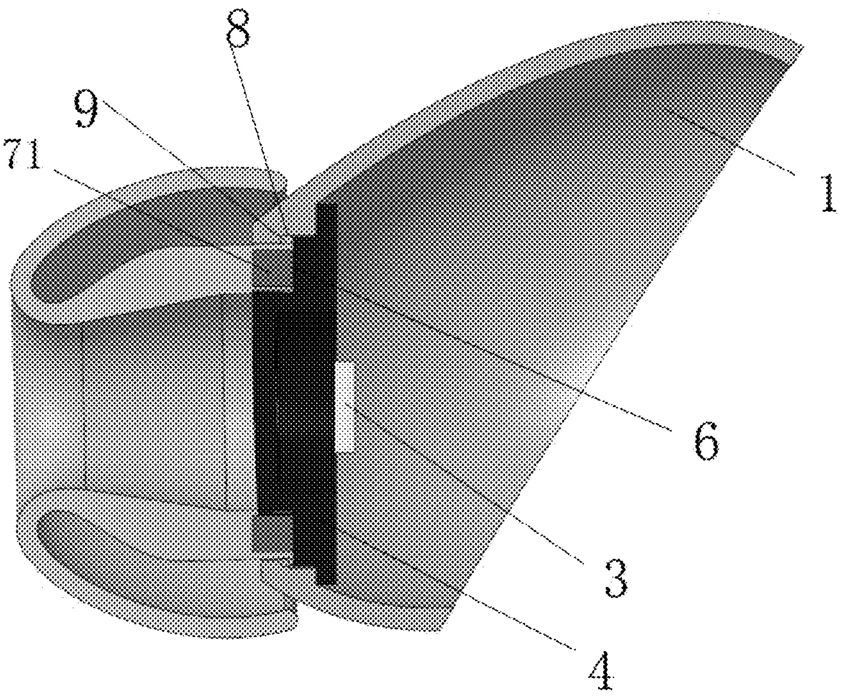

FIG. 2 is a schematic diagram of an earphone according to another embodiment of the present disclosure. The earphone illustrated in FIG. 2 is similar to the earphone illustrated in FIG. 1 in structure and function, and includes: an earphone body 1, a first eartip 2, a sensing module 3, a controller 90 and an eartip fixing member 4.

A structure and a function of the sensing module 3 and the controller 90 are the same as the structure and the function of the sensing module 3 and the controller 90 of the earphone illustrated in FIG. 1, which will not be repeated here. Structures of the earphone body 1, the first eartip 2 and the eartip fixing member 4 are different from the structures of the earphone body 1, the first eartip 2 and the eartip fixing member 4 illustrated in FIG. 1. Only the earphone body 1, the first eartip 2 and the eartip fixing member 4, which are different, are described below.

As a possible implementation, referring to FIG. 2(*a*) and FIG. 2(*b*), the eartip fixing member 4 is arranged at a through hole in a middle of the earphone body 1 and fixed on the inner cavity wall of the earphone body 1, a front end face of the eartip fixing member 4 is a sound output plane 5 of the earphone, a first annular groove 6 for mounting the first eartip 2 is defined between an outer side face of a front end of the eartip fixing member 4 and an inner side face of a front end of the earphone body 1, and the first annular groove 6 is configured to positioning and initially fix the first eartip 2.

Referring to FIG. 2(*b*), a portion of the first eartip 2 embedded in the first annular groove 6 is provided with an annular protrusion 9, and a second annular groove 8 fitted with the annular protrusion 9 is defined between the eartip fixing member 4 and an inner side of the earphone body 1. When the first eartip 2 is embedded into the first annular groove 6 to be mounted on the earphone body 1, the annular protrusion 9 is fitted with the second annular groove 8 to fix the first eartip 2.

The through hole arranged in the middle of the earphone body 1 provides an assembly space for the eartip fixing member 4, and the eartip fixing member 4 is made of an iron material. The annular protrusion 9 of the first eartip 2 is fitted with the second annular groove 8, to have a function of snap-fit, so that the mounting reliability between the first eartip 2 and the earphone body 1 is higher.

Figure 3A:
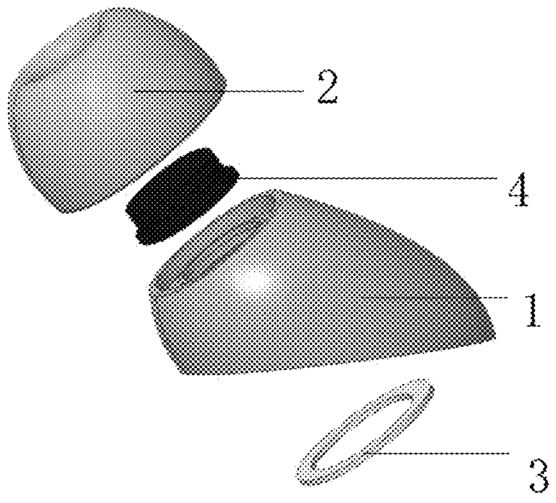
FIG. 3(*a*) to FIG. 3(*b*) are schematic diagrams of an earphone according to another embodiment of the present disclosure, in which (a) is an exploded diagram and (b) is a sectional diagram.
Figure 3B:
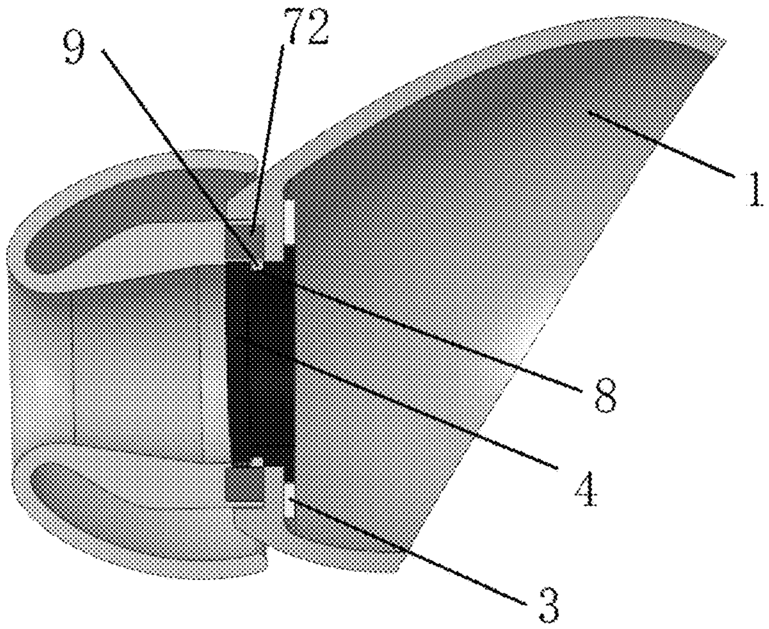
Figure 4A:
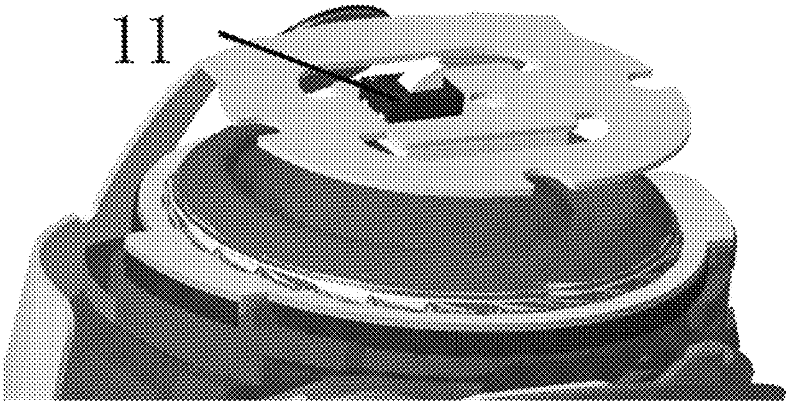
FIG. 4(*a*) to FIG. 4(*h*) are schematic diagrams of an earphone according to another embodiment of the present disclosure, in which (a) is a schematic diagram of the mounting of a detection switch, (b) is a schematic diagram of an inner end cover, (c) is a diagram of an inner side of an outer end cover, (d) is a schematic diagram of an earphone after an outer end cover is mounted, (e) is a schematic diagram of a first eartip, (f) is a schematic diagram after the first eartip is mounted, (g) is a schematic diagram of a second eartip, and (h) is a schematic diagram of an earphone after the second eartip is mounted.
Figure 4B:
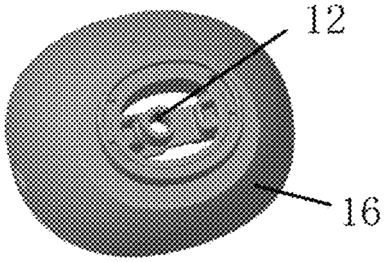
Figure 4C:
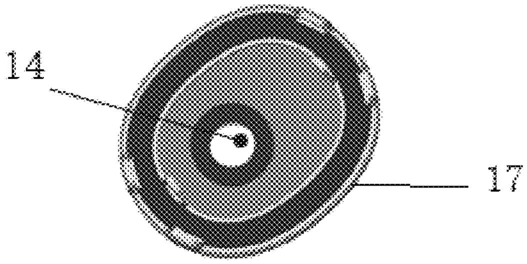
Figure 4D:
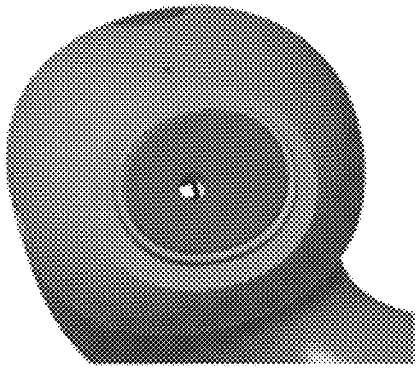
Figure 4E:
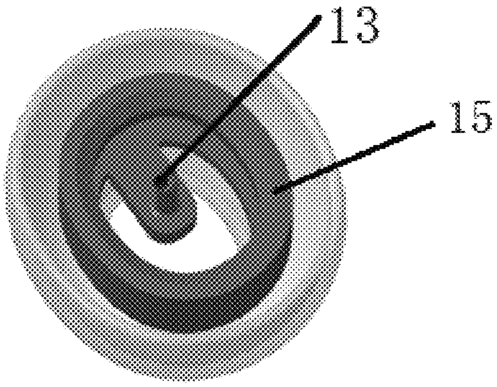
Figure 4F:
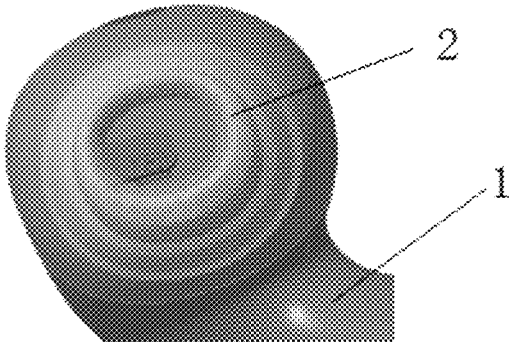
Figure 4G:
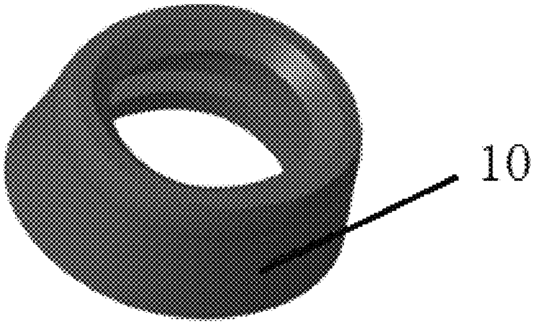
Figure 4H:
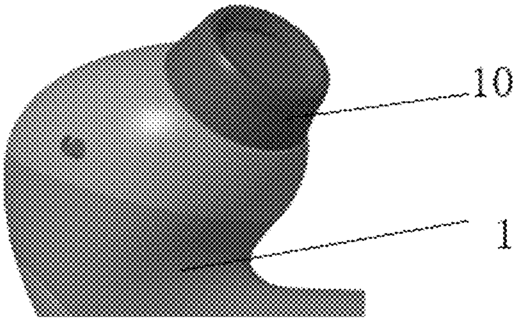
Figure 5A:
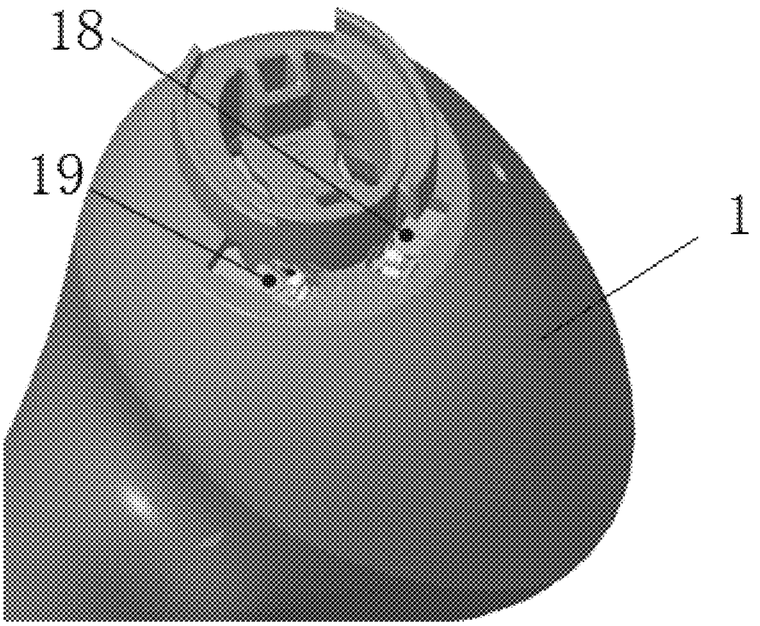
FIG. 5(*a*) to FIG. 5(*e*) are schematic diagrams of an earphone illustrated according to still another embodiment of the present disclosure, in which (a) is a schematic diagram of the mounting of a positive elastic piece and a negative elastic piece of a switch circuit, (b) is another schematic diagram of the mounting of a positive elastic piece and a negative elastic piece of a switch circuit, (c) is a schematic diagram of a first eartip, (d) is a schematic diagram of an earphone after the first eartip is mounted, and (e) is a schematic diagram of an earphone after the second eartip is mounted.
Figure 5B:
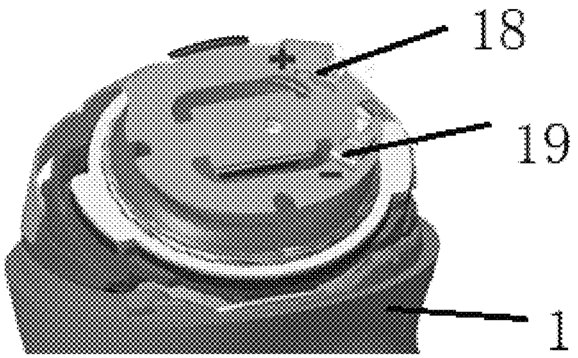
Figure 5C:
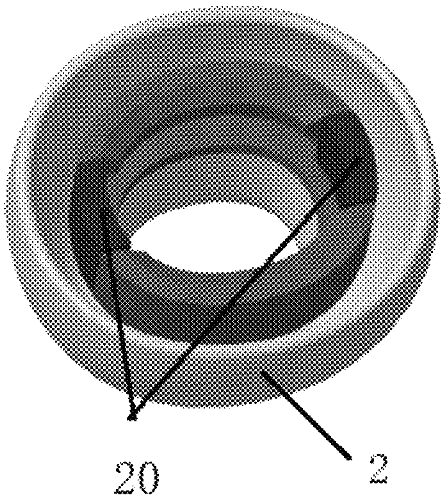
Figure 5D:
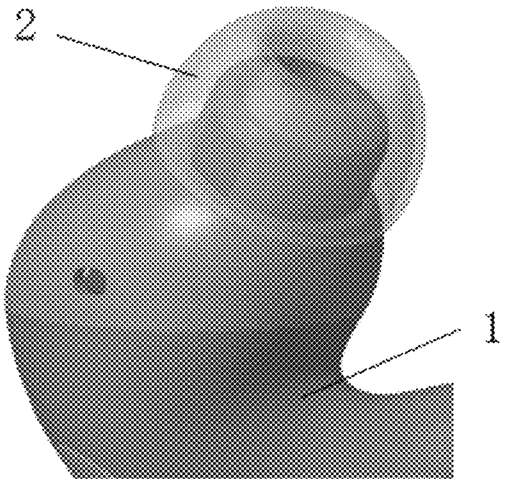
Figure 5E:
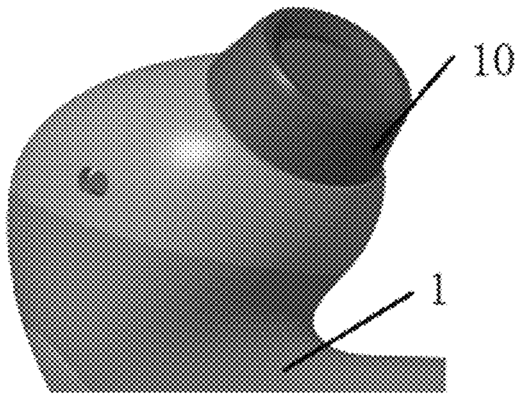

FIG. 3 is a schematic diagram of an earphone according to still another embodiment of the present disclosure. The earphone illustrated in FIG. 3 is similar to the earphone illustrated in FIG. 2 in structure and function, and includes: an earphone body 1, a first eartip 2, a sensing module 3, a controller 90 and an eartip fixing member 4.

Structures of the earphone body 1, the first eartip 2, the sensing module 3 and the eartip fixing member 4 are different from the structures of the earphone body 1, the first eartip 2 and the eartip fixing member 4 illustrated in FIG. 2. Only the earphone body 1, the first eartip 2, the sensing module 3 and the eartip fixing member 4, which are different, are described below.

As a possible implementation, in FIG. 3(*a*) and FIG. 3(*b*), the eartip fixing member 4 is arranged at a through hole in a middle of the earphone body 1 and fixed on an inner cavity wall of the earphone body 1, a front end face of the eartip fixing member 4 is a sound output plane 5 of the earphone, a first annular groove 6 for mounting the first eartip 2 is defined between an outer side face of a front end of the eartip fixing member 4 and an inner side face of a front end of the earphone body 1, and the first annular groove 6 is configured to positioning and initially fix the first eartip 2.

Referring to FIG. 3(*b*), a portion of the first eartip 2 embedded in the first annular groove 6 is provided with an annular protrusion 9, and the eartip fixing member 4 is provided with a second annular groove 8 fitted with the annular protrusion 9. When the first eartip 2 is embedded into the first annular groove 6 to be mounted on the earphone body 1, the annular protrusion 9 is fitted with the second annular groove 8 to fix the first eartip 2.

The through hole of the earphone body 1 provides an assembly space for the eartip fixing member 4. The eartip fixing member 4 is made of a nonconductive material, such as a plastic. The annular protrusion 9 of the first eartip 2 is fitted with the second annular groove 8 to have a function of snap-fit, so that the mounting reliability between the first eartip 2 and the earphone body 1 is higher.

In some examples, in the present embodiment, referring to FIG. 3(*b*), a conductive element 72 is embedded in a rear portion of the first eartip 2. The sensing module 3 includes a capacitance detection device arranged in the earphone body 1, and the capacitance detection device senses the assembly state between the first eartip 2 and the earphone body 1 based on the conductive element 72.

In some examples, the capacitance detection device can be a device composed of a capacitance detection circuit. As an example, the capacitance detection circuit can be arranged on FPC (Flexible Printed Circuit). The capacitance detection device can be configured to sense a change of a capacitance during the mounting of the first eartip 2 into the earphone body 1 and the change of the capacitance during the removal of the first eartip 2 from the earphone body 1, to determine the assembly state between the first eartip 2 and the earphone body 1 according to the change of capacitance, and then send the assembly state to the controller 90. The controller 90 identifies the current earphone mode of the earphone according to the assembly state, and adjusts the acoustic parameter of the earphone according to the current earphone mode.

In some examples, the conductive element 72 may be a metal, a conductive foam, or the like.

For example, when the capacitance detection device senses the conductive element 72, the capacitance detection device determines that the first eartip 2 is mounted on the earphone body 1, and can send a first assembly state information indicating that the first eartip 2 is mounted on the earphone body 1 to the controller 90; when the capacitance detection device does not sense the conductive element 72, the capacitance detection device determines that the first eartip 2 is not mounted on the earphone body 1, and can send a second assembly state information indicating that the first eartip 2 is not mounted on the earphone body 1 to the controller 90.

In the earphone structures illustrated in the above various embodiments, the earphone body is directly designed as the half-in-ear structure, and the in-ear structure is realized by combining a detachable first eartip, so that the earphone structure compatible with the half-in-ear mode and the in-ear mode is realized, and the structure is simple and easy to implement. Moreover, in combination with the sensing result output by the sensing module, the controller 90 can achieve identification of the two modes of the earphone according to the sensing result of the sensing module.

For the structural design of the earphone realizing two earphone modes, a variety of design schemes can be provided. Another design scheme is that: the earphone includes an earphone body 1 and two eartips, namely a first eartip 2 and a second eartip 10. After the first eartip 2 or the second eartip 10 is mounted on the earphone body 1, the half-in-ear earphone structure or the in-ear earphone structure is realized respectively.

FIG. 4 is a schematic diagram of an earphone according to still another embodiment of the present disclosure. Referring to FIG. 4(*a*) to FIG. 4(*h*), the earphone includes the earphone body 1, the first eartip 2, the second eartip 10, a sensing module 3 and a controller 90. The controller 90 is coupled to the sensing module 3. As illustrated in FIG. 4(*a*) to FIG. 4(*h*), the in-ear earphone structure is formed after the first eartip 2 is mounted on the earphone body 1; and the half-in-ear earphone structure is formed after the second eartip 10 is mounted on the earphone body 1.

That is, when the first eartip 2 is mounted on the earphone body 1, the earphone body 1 mounted with the first eartip 2 constitutes an in-ear earphone structure, so that the earphone can become an in-ear earphone. When the second eartip 10 is mounted on the earphone body 1, the earphone body 1 mounted with the second eartip 10 constitutes a half-in-ear earphone structure, so that the earphone can become a half-in-ear earphone. Thus, the structure scheme compatible with the in-ear structure and the half-in-ear structure can be realized depending on whether the first eartip 2 or the second eartip 10 is mounted.

Therefore, it can be seen that the mounting of the first eartip 2 or the second eartip 10 of the earphone realizes the structural scheme compatible with the in-ear structure and the half-in-ear structure. For example, if the half-in-ear mode is selected, referring to FIG. 4(*h*), the second eartip 10 is mounted on the earphone body 1 for use; if the in-ear mode is selected, referring to FIG. 4(*f*), the first eartip 2 is mounted on the earphone body 1 for use.

It can be understood that due to the different structures of the earphone, the sound effect of the earphone will be also different. For example, the sound effect of the half-in-ear earphone structure is different from the sound effect of the in-ear earphone structure. The present disclosure realizes the structure scheme compatible with the in-ear structure and the half-in-ear structure according to the mounting of the first eartip 2 or the second eartip 10. Moreover, in order to switch into the corresponding sound effect when the earphone is in the half-in-ear structure and the in-ear structure, the present disclosure can provide the sensing module 3 in the earphone, and the sensing module 3 identifies whether the earphone is currently in the half-in-ear mode or the in-ear mode, to switch into the corresponding sound effect based on different modes. In the embodiment of the present disclosure, referring to FIG. 4(*a*) to FIG. 4(*h*), the sensing module 3 is arranged on an inner cavity wall of the earphone body 1, and configured to sense the assembly state between the first eartip 2 and the earphone body 1. Two assembly states are included: one is that the first eartip 2 is mounted on the earphone body 1, and the other is that the first eartip 2 is not mounted on the earphone body 1.

In the embodiment of the present disclosure, the controller 90 is configured to obtain the assembly state output by the sensing module 3, identify the current earphone mode of the earphone according to the assembly state, and adjust the acoustic parameter of the earphone according to the current earphone mode.

In an implementation, the controller 90 can be a core control chip in the earphone.

In the embodiment of the present disclosure, the sensing module 3 can sense that the first eartip 2 is currently mounted on the earphone body 1, so that the earphone is configured as the in-ear structure, or, the sensing module 3 can sense that the first eartip 2 is not currently mounted on the earphone body 1, so that the earphone is configured as the half-in-ear structure. For example, the sensing module 3 can send the sensing result (i.e., the assembly state between the first eartip 2 and the earphone body 1) to the controller 90. The controller 90 can receive the assembly state sent by the sensing module 3. At this time, the controller 90 can identify whether the earphone is currently in the in-ear mode or the half-in-ear mode according to the assembly state, and then adjust the acoustic parameter of the earphone according to the current earphone mode.

For example, for the half-in-ear mode, the low frequency needs to be enhanced in principle. Therefore, when the controller 90 identifies that the earphone is currently in the half-in-ear mode, the low frequency can be enhanced by adjusting the value of the acoustic parameter in the acoustic curve, so that the earphone is currently in the sound effect corresponding to the half-in-ear mode, to meet the need of the user for the half-in-ear mode. For the in-ear mode, the low frequency needs to be reduced in principle. Therefore, when the controller 90 identifies that the earphone is currently in the in-ear mode, the low frequency can be reduced by adjusting the value of the acoustic parameter in the acoustic curve to meet the need of the user for the in-ear mode.

The earphone according to the embodiments of the present disclosure can realize the earphone structure compatible with two earphone modes through the structural design of the first eartip, the second eartip and the earphone body. In addition, in the embodiment of the present disclosure, the sensing module senses the assembly state between the first eartip and the earphone body, and the controller 90 will adjust the acoustic parameter of the earphone when identifying that the earphone is currently in the in-ear mode according to the assembly state, to make the adjusted acoustic parameter meet the sound effect of the in-ear mode; and the controller 90 will adjust the acoustic parameter of the earphone when identifying that the earphone is currently in the half-in-ear mode according to the assembly state, to make the adjusted acoustic parameter meet the sound effect of the half-in-ear mode. Therefore, the sound effect can be automatically matched and adjusted under different modes of the earphone and the user experience is improved.

It should be noted that the sensing module can sense the assembly state between the first eartip and the earphone body by using different principles. Due to the different principles used by the sensing module, a structure of the sensing module may also be different. For example, if the sensing module senses the assembly state between the first eartip and the earphone body by measuring a change of a magnetic field around the earphone body, the sensing module may include a Hall sensor. As another example, if the sensing module senses the assembly state between the first eartip and the earphone body by using a trigger assembly, the sensing module may include the trigger assembly. For details, a reference is made to the description of following embodiments.

As a possible implementation, the sensing module 3 includes the trigger assembly arranged in the earphone body 1 and electrically coupled to the controller 90. The first eartip 2 triggers the trigger assembly to switch into a first state indicating that the first eartip 2 is mounted on the earphone body 1, when the first eartip 2 is mounted on the earphone body 1; the trigger assembly switches into a second state when the first eartip 2 is separated from the earphone body 1.

In the present embodiment, referring to FIG. 4(*a*) to FIG. 4(*f*), the trigger assembly is a detection switch 11, a position on the earphone body 1 corresponding to the detection switch 11 is provided with a first opening 12, and an inner side of the first eartip 2 is provided with a pressing portion 13. The pressing portion 13 presses the detection switch 11 corresponding to a position of the first opening 12 when the first eartip 2 is mounted on the earphone body 1, to switch the detection switch 11 into the first state.

In some examples, referring to FIG. 4(*e*), an interior of the first eartip 2 is provided with an eartip hard rubber bracket 15, the eartip hard rubber bracket 15 has a protruding structure extending towards a center of the earphone, and a front end of the protruding structure is provided with the pressing portion 13.

Referring to FIG. 4(*g*), an interior of the second eartip 10 is not provided with the pressing portion 13 capable of activating the detection switch 11. Therefore, after the second eartip 10 is mounted on the earphone body 1, the detection switch 11 is not activated and is in the second state. Referring to FIG. 4(*h*), FIG. 4(*h*) illustrates the half-in-ear earphone structure after mounting the second eartip 10.

For example, when the detection switch 11 is in the first state, it is determined that the first eartip 2 is mounted on the earphone body 1, and a first assembly state information indicating that the first eartip 2 is mounted on the earphone body 1 can be sent to the controller 90; when the detection switch 11 is in the second state, it is determined that the first eartip 2 is not mounted on the earphone body 1, and a second assembly state information indicating that the first eartip 2 is not mounted on the earphone body 1 can be sent to the controller 90.

In some examples, referring to FIG. 4(*a*), the detection switch 11 is arranged on a flexible printed circuit (FPC). The earphone body 1 is provided with an opening enclosure structure around the first opening 12. Referring to FIG. 4(*b*) and FIG. 4(*c*), a front end of the earphone body 1 includes an inner end cover 16 and an outer end cover 17 fitted with each other; referring to FIG. 4(*b*), the first opening 12 is arranged at a position on the inner end cover 16 corresponding to the position of the detection switch 11, and an opening enclosure is provided additionally at the first opening 12; referring to FIG. 4(*c*), a second opening 14 is arranged at a position on a metal mesh of the outer end cover 17 corresponds to the position of the first opening 12, and glue is backed around the second opening 14 to fit with the opening enclosure structure of the inner end cover.

FIG. 5 is a schematic diagram of an earphone according to still another embodiment of the present disclosure. The earphone illustrated in FIG. 5 is similar to the earphone illustrated in FIG. 4 in structure and function. The earphone includes: an earphone body 1, a first eartip 2, a second eartip 10, a sensing module 3 and a controller 90, and the sensing module 3 is a trigger assembly. Only structures different from the earphone illustrated in FIG. 4 are described below.

In the present embodiment, the trigger assembly is a switch circuit. Reference to FIG. 5(*a*) to FIG. 5(*e*), the switch circuit includes a positive elastic piece 18 and a negative elastic piece 19, and an inner side of the first eartip 2 is provided with a metal member 20. The metal member 20 triggers the positive elastic piece 18 and the negative elastic piece 19 to switch into the first state when the first eartip 2 is mounted on the earphone body 1. Here, the first state refers to that the positive elastic piece 18 and the negative elastic piece 19 are in a coupled state.

In some examples, when the first eartip 2 is mounted on the earphone body 1, the positive elastic piece 18 and the negative elastic piece 19 are in the coupled state, i.e., the switch circuit is in a closed state; when the second eartip 10 is mounted on the earphone body 1, the positive elastic piece 18 and the negative elastic piece 19 are in a decoupled state, i.e., the switch circuit is in an open state. The coupled state indicates that the first eartip 2 is mounted on the earphone body 1.

However, the second eartip 10 does not contain the metal member. Therefore, when the second eartip 10 is mounted on the earphone body 1, the positive elastic piece 18 and the negative elastic piece 19 are in the decoupled state. Referring to FIG. 5(*e*), FIG. 5(*e*) illustrates the half-in-ear earphone structure after mounting the second eartip 10.

For example, when the positive elastic piece 18 and the negative elastic piece 19 are in the coupled state, it is determined that the first eartip 2 is mounted on the earphone body 1, and a first assembly state information indicating that the first eartip 2 is mounted on the earphone body 1 can be sent to the controller 90; when the positive elastic piece 18 and the negative elastic piece 19 is in the decoupled state, it is determined that the first eartip 2 is not mounted on the earphone body 1, and a second assembly state information indicating that the first eartip 2 is not mounted on the earphone body 1 can be sent to the controller 90.

In some examples, referring to FIG. 5(*b*), the switch circuit is arranged on a circuit board in the earphone body 1, such as the flexible printed circuit.

In some examples, a hard rubber sleeve at the inner side of the first eartip 2 is provided with at least one section of the metal member 20, and a length of the metal member 20 can meet the need of connecting the positive elastic piece 18 and the negative elastic piece 19. Or, the hard rubber sleeve at the inner side of the first eartip 2 is provided with two metal members 20 configured for signal connection. When the first eartip 2 is mounted, the two metal members 20 correspond to the positive elastic piece 18 and the negative elastic piece 19 respectively. Referring to FIG. 5(*c*), in the present embodiment, two sections of metal members 20 are provided.

In some examples, when the first eartip 2 is mounted on the earphone body 1, the metal member 20 can be correspondingly coupled to the positive elastic piece 18 and the negative elastic piece 19 through a limit structure arranged on the earphone body 1.

In the earphone structure illustrated in the above various embodiments corresponding to FIG. 4(*a*) to FIG. 5(*e*), the earphone structure compatible with the half-in-ear mode and the in-ear mode is realized by combining two detachable eartips, and the structure is simple and easy to implement. Moreover, in combination with the sensing result output by the sensing module, the controller 90 can achieve identification of the two modes of the earphone according to the sensing result.

In addition to the implementation of the sensing module of the above various embodiments, the sensing module can also be implemented by any other structure that can identify the assembly state of the first eartip and the earphone body. For example, the sensing module can also realize a fit detection of the earphone (or called an air tightness detection of the first eartip) by using a speaker and a feedback MIC (microphone), and the identification of the two modes of the earphone is realized by detecting a different leakage in the in-ear mode and the half-in-ear mode.

Figure 6:
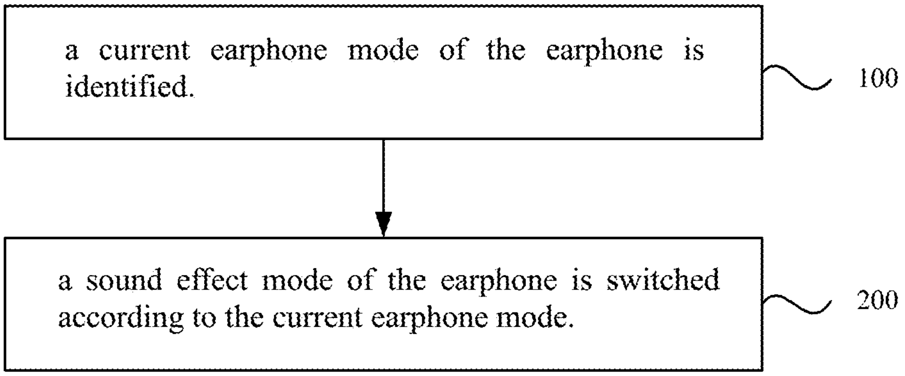
FIG. 6 is a flowchart of a method for controlling an earphone according to an embodiment of the present disclosure.

FIG. 6 is a flowchart of a method for controlling an earphone according to an embodiment. As illustrated in FIG. 6, the method for controlling the earphone may include following steps.

In step 100, a current earphone mode of the earphone is identified.

The earphone to be identified may include the earphone structure given in any one of the above embodiments, which will not be repeated here.

The current earphone mode of the earphone may include an in-ear mode and a half-in-ear mode.

The step of identifying the current earphone mode of the earphone may include:

identifying that the current earphone mode of the earphone is the half-in-ear mode in response to the sensing module identifying that the first eartip is separated from the earphone body; and identifying that the current earphone mode of the earphone is the in-ear mode in response to the sensing module identifying that the first eartip is assembled with the earphone body.

For example, for the earphone structure given in the embodiments illustrated in FIG. 1(*a*) to FIG. 2(*b*), the sensing module includes the Hall sensor. The step of identifying the current earphone mode of the earphone includes:

identifying that the current earphone mode of the earphone is the half-in-ear mode in response to the sensing module sensing that an intensity of a surrounding magnetic field gradually decreases; identifying that the current earphone mode of the earphone is the in-ear mode in response to the sensing module sensing that the intensity of the surrounding magnetic field gradually increases.

For the earphone structure given in the embodiment illustrated in FIG. 3(*a*) and FIG. 3(*b*), the sensing module includes the capacitance detection device. The step of identifying the current earphone mode of the earphone includes:

identifying that the current earphone mode of the earphone is the in-ear mode in response to the sensing module sensing that a capacitance value increases; identifying that the current earphone mode of the earphone is the half-in-ear mode in response to the sensing module sensing that the capacitance value decreases.

For the earphone structure given in the embodiment illustrated in FIG. 4(*a*) to FIG. 4(*h*), the sensing module includes the detection switch. The step of identifying the current earphone mode of the earphone includes:

identifying that the current earphone mode of the earphone is the half-in-ear mode in response to the sensing module sensing that the detection switch is in the second state; identifying that the current earphone mode of the earphone is the in-ear mode in response to the sensing module sensing that the detection switch is in the first state.

For the earphone structure given in the embodiments illustrated in FIG. 5(*a*) to FIG. 5(*e*), the sensing module includes the switch circuit. The step of identifying the current earphone mode of the earphone includes:

identifying that the current earphone mode of the earphone is the half-in-ear mode in response to the sensing module sensing that the positive elastic piece and the negative elastic piece are in the decoupled state; identifying that the current earphone mode of the earphone is the in-ear mode in response to the sensing module sensing that the positive elastic piece and the negative elastic piece are in the coupled state.

In step 200, the acoustic parameter of the earphone is adjusted according to the current earphone mode.

In an implementation, the acoustic parameter may include, but is not limited to, the frequency, the amplitude or the phase of various harmonic wave. For example, the acoustic curve can be formed based on the acoustic parameter such as the frequency, the amplitude or the phase of various harmonic wave, and the sound effect can be switched under different earphone modes by adjusting the value of the acoustic parameter in the acoustic curve.

For example, for the half-in-ear mode, the low frequency needs to be enhanced in principle. Therefore, when identifying that the earphone is currently in the half-in-ear mode, the low frequency can be enhanced by adjusting the value of the acoustic parameter in the acoustic curve, so that the earphone is currently in the sound effect corresponding to the half-in-ear mode, to meet the need of the user for the half-in-ear mode. For the in-ear mode, the low frequency needs to be reduced in principle. Therefore, when identifying that the earphone is currently in the in-ear mode, the low frequency can be reduced by adjusting the value of the acoustic parameter in the acoustic curve to meet the need of the user for the in-ear mode.

Figure 7A:
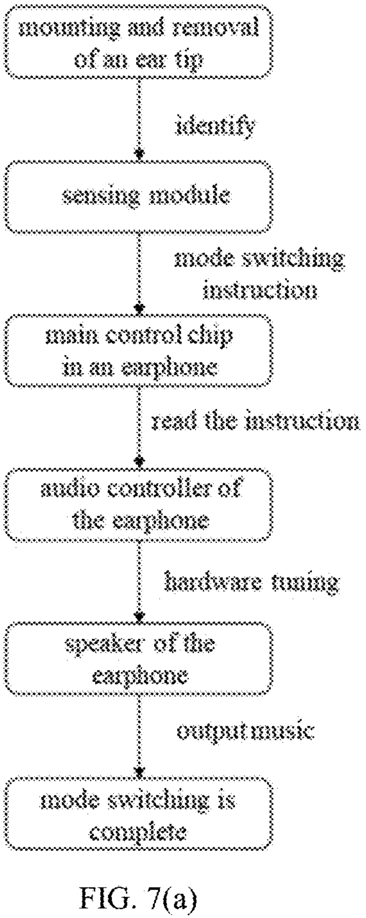
FIG. 7(*a*) to FIG. 7(*b*) are principle diagrams of a method for controlling an earphone according to an embodiment of the present disclosure, in which (a) is a hardware tuning mode and (b) is a software tuning mode.
Figure 7B:
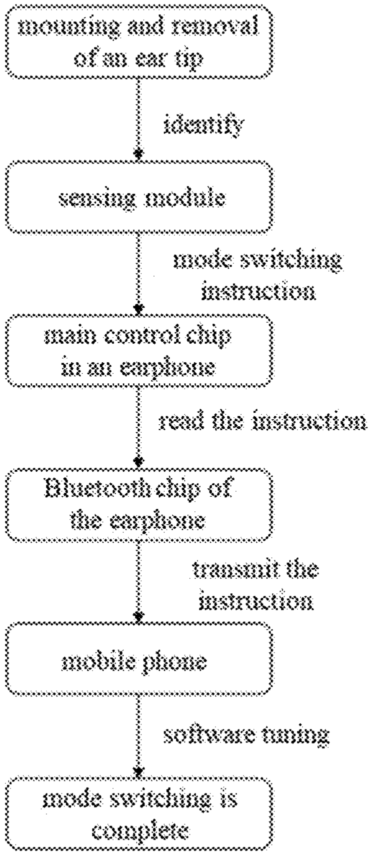

As a possible implementation, referring to FIG. 7(*a*), the step of adjusting the acoustic parameter of the earphone according to the current earphone mode includes:

generating a sound effect mode switching instruction corresponding to the current earphone mode according to the current earphone mode;

sending the sound effect mode switching instruction to an audio controller of the earphone; in which the sound effect mode switching instruction is configured to instruct the audio controller to perform hardware tuning, to switch a sound effect mode of the earphone into a sound effect matched with the current earphone mode.

For example, the audio controller can adjust the value of the acoustic parameter in the acoustic curve, realizing the hardware tuning through the audio controller, so that the sound effect mode of the earphone is switched into the sound effect matched with the current earphone mode.

As a possible implementation, referring to FIG. 7(*b*), the step of adjusting the acoustic parameter of the earphone according to the current earphone mode includes:

generating the sound effect mode switching instruction corresponding to the current earphone mode according to the current earphone mode;

sending the sound effect mode switching instruction to an external sound source apparatus coupled to the earphone; in which the sound effect mode switching instruction is configured to instruct the external sound source apparatus to perform software tuning, to switch the sound effect mode of the earphone into the sound effect matched with the current earphone mode.

In some examples, the sound source apparatus is an electronic apparatus with a music playing function, such as a music player, a mobile phone, a tablet.

Taking the mobile phone as an example, after receiving the sound effect mode switching instruction, the mobile phone performs the software tuning, and the earphone mode can be adjusted, i.e., the value of the acoustic parameter in the acoustic curve is adjusted. For example, the earphone mode includes a mid-bass mode and a rock mode.

The method for controlling the earphone according to the embodiments of the present disclosure is applied to a scene of a single device. The sensing module is provided in the earphone, and can automatically detect the mounting and the removal of the eartip (or the mounting and the removal of the first eartip or the second eartip), to identify the earphone mode of the earphone, so that the sound effect of the earphone is switched automatically, and the intelligent matching between the sound effect mode and the earphone mode is realized.

Figure 8:
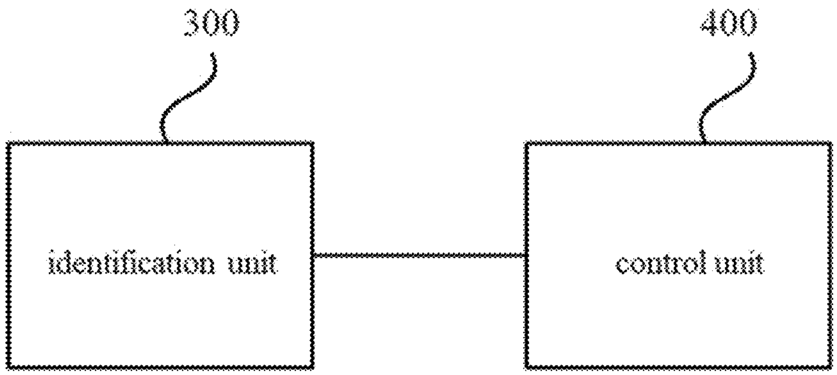
FIG. 8 is a block diagram of a device for controlling an earphone according to an embodiment of the present disclosure.

As an implementation of the method illustrated in the various figures described above, the present disclosure provides an embodiment of a virtual device implementing the method for controlling the earphone. FIG. 8 is a block diagram of a device for controlling an earphone illustrated according to an embodiment. Referring to FIG. 8, the device includes an identification unit 300 and a control unit 400.

The identification unit 300 is configured to identify a current earphone mode of the earphone.

The control unit 400 is configured to adjust the acoustic parameter of the earphone according to the current earphone mode.

As for the device in the above embodiment, a specific mode how each module performs an operation and its effect have been described in detail in the embodiment related to the method, which will not be described in detail here.

Figure 9:
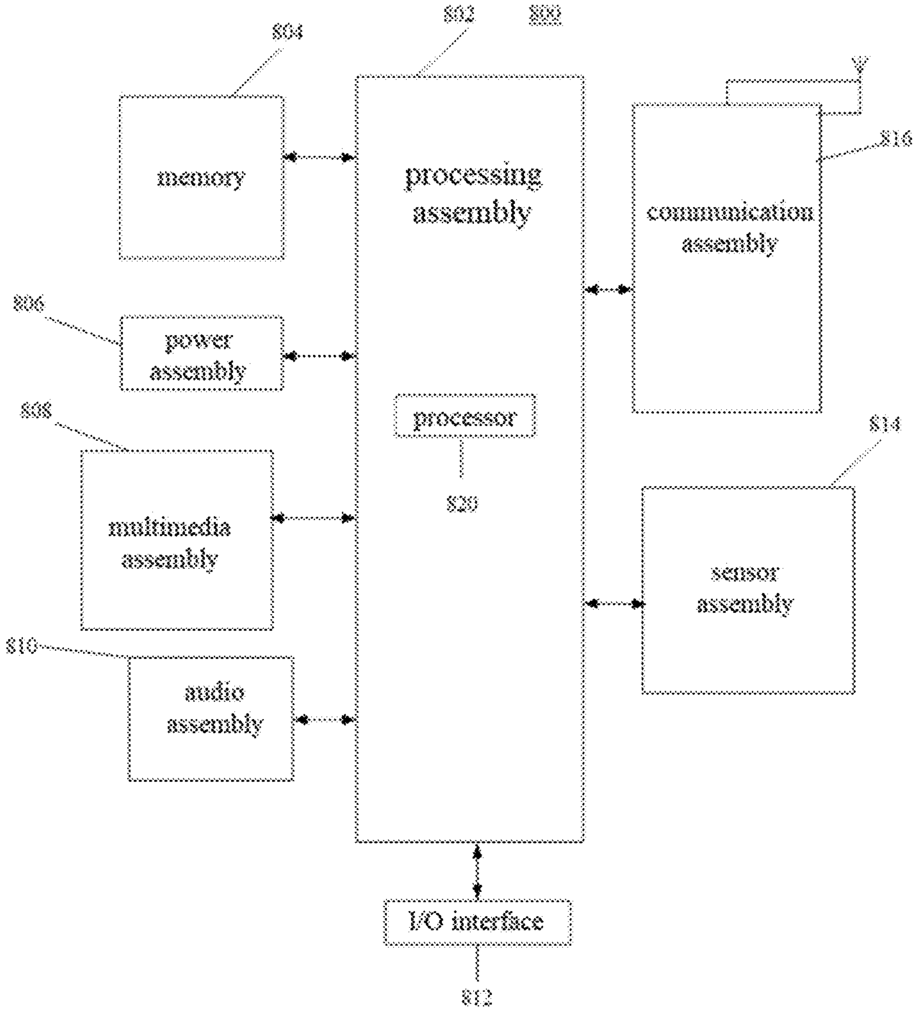
FIG. 9 is a block diagram of an electronic apparatus according to an embodiment of the present disclosure.

FIG. 9 is a block diagram of an electronic apparatus 800 for implementing a method for controlling an earphone according to an embodiment. For example, the electronic apparatus 800 may be a mobile phone, a computer, a digital broadcasting terminal, a messaging device, a game console, a tablet device, a medical device, a fitness device, a personal digital assistant.

Referring to FIG. 9, the electronic apparatus 800 may include one or more of the following assemblies: a processing assembly 802, a memory 804, a power assembly 806, a multimedia assembly 808, an audio assembly 810, an input/output (I/O) interface 812, a sensor assembly 814, and a communication assembly 816.

The processing assembly 802 generally controls an overall operation of the electronic apparatus 800, such as operations associated with a display, a telephone call, a data communication, a camera operation, and a recording operation. The processing assembly 802 may include one or more processors 820 for executing an instruction, to complete all or part of the steps of the above method. In addition, the processing assembly 802 may include one or more modules, to facilitate an interaction between the processing assembly 802 and other assemblies. For example, the processing assembly 802 may include a multimedia module to facilitate an interaction between a multimedia assembly 808 and the processing assembly 802.

The memory 804 is configured to store various types of data to support the operation at the apparatus 800. Examples of these data include an instruction for any application or method operating on the electronic apparatus 800, contact data, phonebook data, a message, a picture, a video, and the like. The memory 804 may be implemented by any type of volatile storage device or nonvolatile storage device or a combination thereof, such as a static random access memory (SRAM), an electrically erasable programmable read only memory (EEPROM), an erasable programmable read only memory (EPROM), a programmable read only memory (PROM), a read only memory (ROM), a magnetic memory, a flash memory, a disk or a disc.

The power assembly 806 provides power to various assemblies of the electronic apparatus 800. The power assembly 806 may include a power management system, one or more power supplies, and other assemblies associated with generating, managing, and distributing power for the electronic apparatus 800.

The multimedia assembly 808 includes a screen providing an output interface between the electronic apparatus 800 and the user. In some embodiments, the screen may include a liquid crystal display (LCD) and a touch panel (TP). If the screen includes a touch panel, the screen may be implemented as a touch screen to receive an input signal from the user. The touch panel includes one or more touch sensors to sense a touch, a swipe and a gesture on the touch panel. The touch sensor can not only sense a boundary of the touch operation or the swipe operation, but also detect duration and a pressure associated with the touch operation or the swipe operation. In some embodiments, the multimedia assembly 808 includes a front camera and/or a rear camera. When the apparatus 800 is in an operation mode, such as a shooting mode or a video mode, the front camera and/or the rear camera can receive external multimedia data. Each of the front camera and the rear camera can be a fixed optical lens system or have a focal length and an optical zoom capability.

The audio assembly 810 is configured to output and/or input an audio signal. For example, the audio assembly 810 includes a microphone (MIC) configured to receive an external audio signal when the electronic apparatus 800 is in the operation mode, such as a call mode, a recording mode, and a speech recognition mode. The received audio signal may be further stored in the memory 804 or transmitted via the communication assembly 816. In some embodiments, the audio assembly 810 further includes a speaker for outputting the audio signal.

The I/O interface 812 provides an interface between the processing assembly 802 and a peripheral interface module, and the peripheral interface module can be a keyboard, a click wheel, a button, etc. These buttons may include but are not limited to: a Home button, a volume button, a start button and a lock button.

The sensor assembly 814 includes one or more sensors, for providing a state evaluation in various aspects for the electronic apparatus 800. For example, the sensor assembly 814 can detect an open state/a closed state of the apparatus 800 and a relative positioning of assemblies, such as a display and a keypad of the electronic apparatus 800. The sensor assembly 814 can further detect a position change of the electronic apparatus 800 or an assembly of the electronic apparatus 800, the presence or the absence of a contact of the user with the electronic apparatus 800, an orientation or an acceleration/a deceleration of the electronic apparatus 800 and a temperature change of the electronic apparatus 800. The sensor assembly 814 may include a proximity sensor configured to detect the presence of nearby objects without any physical contact. The sensor assembly 814 may further include an optical sensor, such as a CMOS image sensor or a CCD image sensor, for use in imaging applications. In some embodiments, the sensor assembly 814 may further include an acceleration sensor, a gyroscope sensor, a magnetic sensor, a pressure sensor, or a temperature sensor.

The communication assembly 816 is configured to facilitate a wired communication or a wireless communication between the electronic apparatus 800 and other devices. The electronic apparatus 800 may be coupled to a wireless network based on a communication standard, such as WiFi, 2G or 3G, or a combination thereof. In an embodiment, the communication assembly 816 receives a broadcast signal or broadcast information from an external broadcast management system via a broadcast channel. In an embodiment, the communication assembly 816 further includes a near-field communication (NFC) module to facilitate a short-range communication. For example, the NFC module can be implemented based on radio frequency identification (RFID) technology, an infrared data association (IrDA) technology, a ultra wideband (UWB) technology, a Bluetooth (BT) technology and other technologies.

In an embodiment, the electronic apparatus 800 may be implemented by one or more of an application specific integrated circuit (ASIC), a digital signal processor (DSP), a digital signal processing device (DSPD), a programmable logic device (PLD), a field programmable gate array (FPGA), a controller, a microcontroller, a microprocessor, or other electronic elements, for performing the above method.

In an embodiment, a non-temporary computer-readable storage medium including an instruction, such as the memory 804 including an instruction, which can be executed by the processor 820 of the electronic apparatus 800 to complete the above method, is further provided. For example, the non-temporary computer-readable storage medium can be a ROM, a random access memory (RAM), a CD-ROM, a magnetic tape, a floppy disk, an optical data storage device, etc.

A computer program product includes a computer program that, when executed by a processor, implements the steps of the method for controlling the earphone described in any one of the above embodiments.

Other implementations of the present disclosure may be conceivable for those skilled in the art after considering the specification and practicing the invention disclosed herein. The present disclosure is intended to cover any variations, uses, or adaptive changes of the present disclosure. These variations, uses, or adaptive changes follow the general principles of the present disclosure and include common knowledge or conventional technical means in the technical field that are not disclosed in the present disclosure. The specification and the embodiments are regarded as exemplary only, and the true scope and spirit of the present disclosure are indicated by the following claims.

According to a first aspect of embodiments of the present disclosure, the earphone is provided, and includes: an earphone body; a first eartip, the earphone having an in-ear earphone structure when the first eartip is mounted on the earphone body; a sensing module arranged on an inner cavity wall of the earphone body, and configured to sense an assembly state between the first eartip and the earphone body; and a controller coupled to the sensing module and configured to obtain the assembly state output by the sensing module, identify a current earphone mode of the earphone according to the assembly state, and adjust an acoustic parameter of the earphone according to the current earphone mode.

In some embodiments of the present disclosure, a front end of the earphone body is configured as a half-in-ear earphone structure.

In some embodiments of the present disclosure, a sound output plane of the earphone body is parallel to a plane where a sound output hole of the earphone body is located; or, the sound output plane of the earphone body protrudes beyond the plane where the sound output hole of the earphone body is located, and a protruding height is less than a preset height.

In some embodiments of the present disclosure, the earphone further includes a second eartip, and the earphone has a half-in-ear earphone structure when the second eartip is mounted on the earphone body.

In some embodiments of the present disclosure, the earphone further includes an eartip fixing member arranged on the inner cavity wall of the earphone body. A material of the eartip fixing member is a magnetic material or an iron material, or the eartip fixing member is provided with the magnetic material. One or more magnetic members are embedded in a mounting portion of the first eartip. An area of the earphone body in contact with the mounting portion of the first eartip is provided with a first annular groove, and the first annular groove is configured to position the first eartip when the first eartip is mounted on the earphone body. The eartip fixing member attracts the magnetic member in the first eartip to fix the first eartip.

In some embodiments of the present disclosure, the earphone further includes an eartip fixing member. The eartip fixing member is arranged at a through hole in a middle of the earphone body and fixed on the inner cavity wall of the earphone body. A front end face of the eartip fixing member is the sound output plane of the earphone. The first annular groove for mounting the first eartip is defined between an outer side face of a front end of the eartip fixing member and an inner side face of the front end of the earphone body. A portion of the first eartip embedded in the first annular groove is provided with an annular protrusion. A second annular groove fitted with the annular protrusion is defined between the eartip fixing member and an inner side of the earphone body. Or, the eartip fixing member is provided with the second annular groove fitted with the annular protrusion.

In some embodiments of the present disclosure, the magnetic member is embedded in a rear portion of the first eartip. The sensing module includes a Hall sensor, and the Hall sensor is arranged in the earphone body. The Hall sensor senses the assembly state between the first eartip and the earphone body based on the magnetic member.

In some embodiments of the present disclosure, the Hall sensor identifies that the earphone mode of the earphone is an in-ear mode in response to the Hall sensor sensing the magnetic member; the Hall sensor identifies that the earphone mode of the earphone is a half-in-ear mode in response to the Hall sensor not sensing the magnetic member.

In some embodiments of the present disclosure, a conductive element is embedded in the rear portion of the first eartip. The sensing module includes a capacitance detection device arranged in the earphone body, and the capacitance detection device senses the assembly state between the first eartip and the earphone body based on the conductive element.

In some embodiments of the present disclosure, the capacitance detection device identifies that the earphone mode of the earphone is the in-ear mode in response to the capacitance detection device sensing the conductive element; the capacitance detection device identifies that the earphone mode of the earphone is the half-in-ear mode in response to the capacitance detection device not sensing the conductive element.

In some embodiments of the disclosure, the sensing module includes a trigger assembly arranged in the earphone body and electrically coupled to the controller. The first eartip triggers the trigger assembly to switch into a first state indicating that the first eartip is mounted on the earphone body when the first eartip is mounted on the earphone body; the trigger assembly is switched into a second state when the first eartip is separated from the earphone body.

In some embodiments of the disclosure, the trigger assembly is a detection switch, a position on the earphone body corresponding to the detection switch is provided with a first opening, and an inner side of the first eartip is provided with a pressing portion. The pressing portion presses the detection switch corresponding to a position of the first opening when the first eartip is mounted on the earphone body, to switch the detection switch into the first state.

In some embodiments of the present disclosure, an interior of the first eartip is provided with an eartip hard rubber bracket, the eartip hard rubber bracket has a protruding structure extending towards a center of the earphone, and a front end of the protruding structure is provided with the pressing portion.

In some embodiments of the present disclosure, the trigger assembly is a switch circuit, and the switch circuit includes a positive elastic piece and a negative elastic piece. An inner side of the first eartip is provided with a metal member, and the metal member triggers the positive elastic piece and the negative elastic piece to switch into the first state when the first eartip is mounted on the earphone body.

According to a second aspect of the embodiments of the present disclosure, a method for controlling the earphone is provided, and includes: identifying a current earphone mode of the earphone; adjusting an acoustic parameter of the earphone according to the current earphone mode.

In some embodiments of the present disclosure, the method controls the earphone described in the first aspect, and a step of identifying the current earphone mode of the earphone includes: identifying that the current earphone mode of the earphone is a half-in-ear mode in response to the sensing module identifying that a first eartip is separated from the earphone body; identifying that the current earphone mode of the earphone is an in-ear mode in response to the sensing module identifying that the first eartip is assembled with the earphone body.

In some embodiments of the present disclosure, a step of switching a sound effect mode of the earphone according to the current earphone mode includes: generating a sound effect mode switching instruction corresponding to the current earphone mode according to the current earphone mode; sending the sound effect mode switching instruction to an audio controller of the earphone, in which the sound effect mode switching instruction is configured to instruct the audio controller to perform hardware tuning, to switch the sound effect mode of the earphone into a sound effect matched with the current earphone mode.

In some embodiments of the present disclosure, the step of switching the sound effect mode of the earphone according to the current earphone mode includes: generating the sound effect mode switching instruction corresponding to the current earphone mode according to the current earphone mode; sending the sound effect mode switching instruction to an external sound source apparatus coupled to the earphone, in which the sound effect mode switching instruction is configured to instruct the external sound source apparatus to perform software tuning, to switch the sound effect mode of the earphone into the sound effect matched with the current earphone mode.

According to a third aspect of the embodiments of the present disclosure, a device for controlling an earphone is provided, and includes: an identification unit configured to identify a current earphone mode of the earphone; and a control unit configured to adjust an acoustic parameter of the earphone according to the current earphone mode.

According to a fourth aspect of the embodiments of the present disclosure, an electronic apparatus is provided, and includes: at least one processor and a memory in communication with the at least one processor. The memory stores an instruction executable by the at least one processor, and the instruction is executed by the at least one processor, so that the at least one processor performs a method described in any embodiment in the above third aspect.

According to a fifth aspect of the embodiments of the present disclosure, a non-transitory computer-readable storage medium storing a computer instruction for causing the computer to perform a method described in any embodiment in the above third aspect is provided.

According to a sixth aspect of the embodiments of the present disclosure, a computer program product is provided, and includes a computer program implementing steps of a method described in any embodiment in the above third aspect when executed by a processor.

The technical solution provided by the embodiments of the present disclosure may include the following beneficial effects:

Through a detachable combination of the eartip and the earphone body, a structure design compatible with the in-ear mode and the half-in-ear mode can be realized structurally in a single earphone. Moreover, by adding the sensing module, the present disclosure can automatically identify whether the earphone is the in-ear mode or half-in-ear mode, and a sound effect is tuned according to an identified result, so that the problem that the sound effect mismatches after switching between the in-ear mode and a half-in-ear mode is solved, and the dual switching of the earphone mode and the sound effect is realized.

It should be understood that the present disclosure is not limited to the particular structures described above and illustrated in the accompanying drawings, and various modifications and changes can be made without departing from the scope of the present disclosure. The scope of the present disclosure is only limited by the appended claims.

What is claimed is:

1. An earphone, comprising:

an earphone body;

a first eartip, wherein the earphone has an in-ear earphone structure when the first eartip is mounted on the earphone body;

a sensing module arranged on an inner cavity wall of the earphone body, and configured to sense an assembly state between the first eartip and the earphone body; and a controller coupled to the sensing module and configured to obtain the assembly state output by the sensing module, identify a current earphone mode of the earphone according to the assembly state, and adjust an acoustic parameter of the earphone according to the current earphone mode, wherein the sensing module comprises a trigger assembly arranged in the earphone body and electrically coupled to the controller;

wherein when the first eartip is mounted on the earphone body, the first eartip triggers the trigger assembly to switch into a first state indicating that the first eartip is mounted on the earphone body; the trigger assembly is switched into a second state when the first eartip is separated from the earphone body.

2. The earphone according to claim 1, wherein a front end of the earphone body is configured as a half-in-ear earphone structure.

3. The earphone according to claim 1, wherein a sound output plane of the earphone body is selected from the group consisting of:

protruded from a plane where a sound output hole of the earphone body is located by a protruding distance, coplanar with the plane where the sound output hole of the earphone body is located, and recessed from the plane where the sound output hole of the earphone body is located by a recessing distance.

4. The earphone according to claim 1, wherein the earphone further comprises a second eartip, wherein the earphone has a half-in-ear earphone structure when the second eartip is mounted on the earphone body.

5. The earphone according to claim 1, further comprising:

an eartip fixing member arranged on the inner cavity wall of the earphone body, the eartip fixing member being at least one of: made of a magnetic material or an iron material, and provided with a magnetic material;

wherein one or more magnetic members are embedded in a mounting portion of the first eartip, an area of the earphone body in contact with the mounting portion of the first eartip is provided with a first annular groove, the first annular groove is configured to position the first eartip when the first eartip is mounted on the earphone body, and the eartip fixing member attracts the one or more magnetic members in the first eartip to fix the first eartip.

6. The earphone according to claim 5, wherein the one or more magnetic members are embedded in a rear portion of the first eartip, the sensing module comprises a Hall sensor arranged in the earphone body, and the Hall sensor senses the assembly state between the first eartip and the earphone body based on the one or more magnetic members.

7. The earphone according to claim 6, wherein the Hall sensor identifies that the current earphone mode of the earphone is an in-ear mode in response to the Hall sensor sensing the magnetic member; the Hall sensor identifies that the current earphone mode of the earphone is a half-in-ear mode in response to the Hall sensor not sensing the magnetic member.

8. The earphone according to claim 1, further comprising an eartip fixing member, wherein, the eartip fixing member is arranged at a through hole in a middle of the earphone body and fixed on the inner cavity wall of the earphone body, a front end face of the eartip fixing member is a sound output plane of the earphone, and a first annular groove configured to mount the first eartip is defined between an outer side face of a front end of the eartip fixing member and an inner side face of a front end of the earphone body;

a portion of the first eartip embedded in the first annular groove is provided with an annular protrusion, and a second annular groove fitted with the annular protrusion is defined at least one of between the eartip fixing member and an inner side of the earphone body, and in the eartip fixing member.

9. The earphone according to claim 8, wherein a conductive element is embedded in a rear portion of the first eartip; the sensing module comprises a capacitance detection device arranged in the earphone body, and the capacitance detection device senses the assembly state between the first eartip and the earphone body based on the conductive element.

10. The earphone according to claim 9, wherein the capacitance detection device identifies that the current earphone mode of the earphone is an in-ear mode in response to the capacitance detection device sensing the conductive element; the capacitance detection device identifies that the current earphone mode of the earphone is a half-in-ear mode in response to the capacitance detection device not sensing the conductive element.

11. The earphone according to claim 1, wherein the trigger assembly is a detection switch, a position on the earphone body corresponding to the detection switch is provided with a first opening, and an inner side of the first eartip is provided with a pressing portion;

wherein the pressing portion presses the detection switch corresponding to a position of the first opening when the first eartip is mounted on the earphone body, to switch the detection switch into the first state.

12. The earphone according to claim 11, wherein an interior of the first eartip is provided with an eartip hard rubber bracket, the eartip hard rubber bracket has a protruding structure extending towards a center of the earphone, and a front end of the protruding structure is provided with the pressing portion.

13. The earphone according to claim 1, wherein the trigger assembly is a switch circuit, and the switch circuit comprises a positive elastic piece and a negative elastic piece; and an inner side of the first eartip is provided with a metal member, and the metal member triggers the positive elastic piece and the negative elastic piece to switch into the first state when the first eartip is mounted on the earphone body.

14. A method for controlling an earphone, comprising:

identifying a current earphone mode of the earphone from a plurality of earphone modes of the earphone, the plurality of earphone modes including half-in-ear mode and in-ear mode; and adjusting an acoustic parameter of the earphone according to the current earphone mode, wherein adjusting an acoustic parameter of the earphone according to the current earphone mode according to the current earphone mode comprises:

generating a sound effect mode switching instruction corresponding to the current earphone mode according to the current earphone mode; and sending the sound effect mode switching instruction to an external sound source apparatus coupled to the earphone, wherein the sound effect mode switching instruction is configured to instruct the external sound source apparatus to perform software tuning, to switch the sound effect mode of the earphone into the sound effect matched with the current earphone mode.

15. The method according to claim 14, wherein the method is configured to control an earphone, the earphone comprising:

an earphone body;

a first eartip, wherein the earphone has an in-ear earphone structure when the first eartip is mounted on the earphone body;

a sensing module arranged on an inner cavity wall of the earphone body, and configured to sense an assembly state between the first eartip and the earphone body; and a controller coupled to the sensing module and configured to obtain the assembly state output by the sensing module, identify a current earphone mode of the earphone according to the assembly state, and adjust an acoustic parameter of the earphone according to the current earphone mode; and wherein identifying a current earphone mode of the earphone comprises:

identifying that the current earphone mode of the earphone is the half-in-ear mode in response to the sensing module identifying that the first eartip is separated from the earphone body; and identifying that the current earphone mode of the earphone is the in-ear mode in response to the sensing module identifying that the first eartip is assembled with the earphone body.

16. The method according to any one of claim 14, wherein adjusting an acoustic parameter of the earphone according to the current earphone mode comprises:

generating a sound effect mode switching instruction corresponding to the current earphone mode according to the current earphone mode; and sending the sound effect mode switching instruction to an audio controller of the earphone, wherein the sound effect mode switching instruction is configured to instruct the audio controller to perform hardware tuning, to switch the sound effect mode of the earphone into a sound effect matched with the current earphone mode.

17. An electronic apparatus, comprising:

at least one processor; and a memory in communication with the at least one processor, wherein the memory stores an instruction executable by the at least one processor, and the instruction is executed by the at least one processor such that the at least one processor performs a method according to claim 14.

18. A device for controlling an earphone, comprising:

an identification unit configured to identify a current earphone mode of the earphone from a plurality of earphone modes of the earphone, the plurality of earphone modes including half-in-ear mode and in-ear mode; and a control unit configured to adjust an acoustic parameter of the earphone according to the current earphone mode, wherein the control unit is configured to generate a sound effect mode switching instruction corresponding to the current earphone mode according to the current earphone mode; and send the sound effect mode switching instruction to an external sound source apparatus coupled to the earphone, wherein the sound effect mode switching instruction is configured to instruct the external sound source apparatus to perform software tuning, to switch the sound effect mode of the earphone into the sound effect matched with the current earphone mode.

* * * * *